United States Patent Office 3,040,371
Patented June 26, 1962

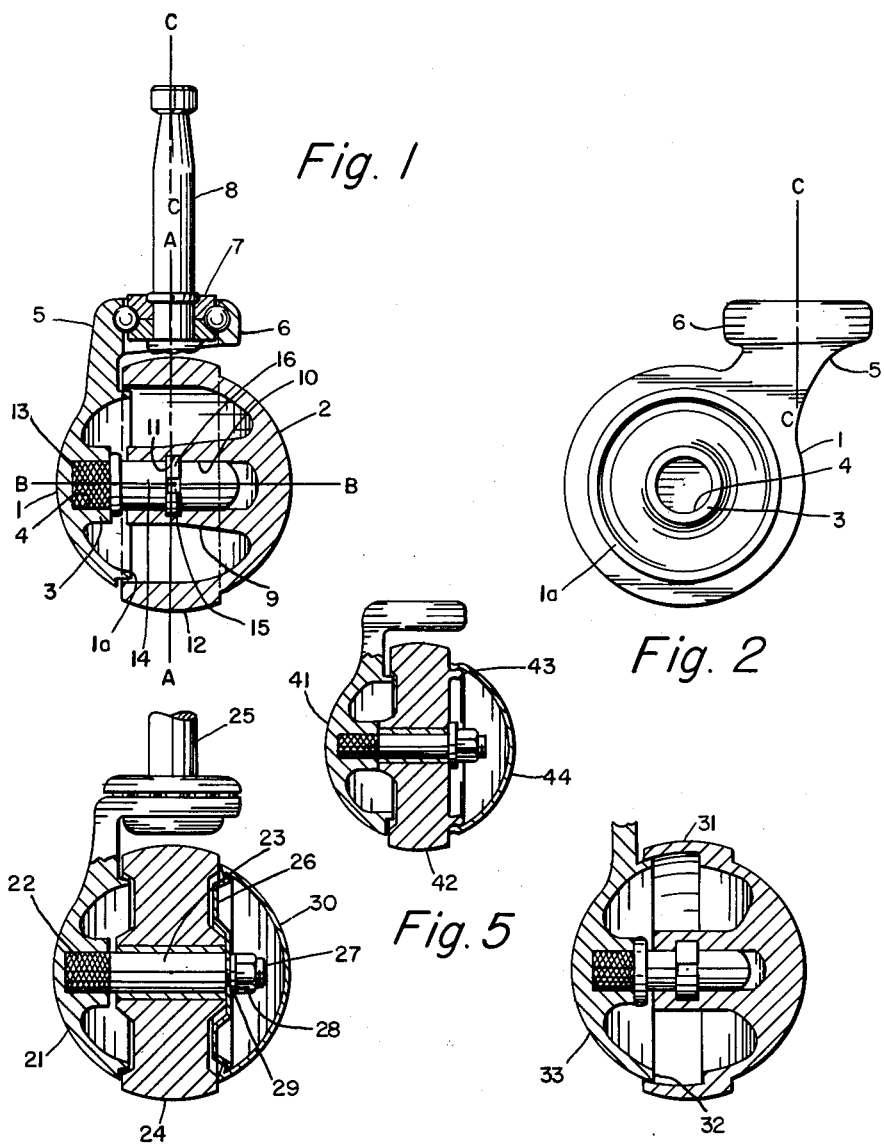

3,040,371
CASTERS
Albert E. Rice and Ford A. Rice, both of
552 Leader Bldg., Cleveland, Ohio
Filed July 28, 1960, Ser. No. 45,932
2 Claims. (Cl. 16—31)

This invention relates generally to casters, but has reference more particularly to casters of the type in which a rotary floor engaging element is rotatably mounted on an axle which is offset from the vertical stem or swivel axle of the caster.

A primary object of the invention is to provide a caster of the character described, in which the rotary floor engaging wheel or element has its diametral plane disposed vertically and substantially perpendicularly to the axis of rotation of the wheel, which axis extends horizontally.

Another object of the invention is to provide a caster of the character described, in which the vertical stem or swivel axis of the caster is offset horizontally from the axis of rotation of the wheel.

A further object of the invention is to provide a caster of the character described, in which various parts of the caster are of unique construction, and in which the parts are secured together in a simple manner, and with a minimum number of fastening elements.

Other objects and advantages of my invention will be apparent during the course of the following description.

In the accompanying drawings forming a part of this specification, and in which like numerals are employed to designate like parts throughout the same, FIG. 1 is a vertical cross-sectional view of a caster embodying the invention;

FIG. 2 is an elevational view of the body section of the caster shown in FIG. 1, as viewed from the right side of said body section;

FIG. 3 is a view similar to FIG. 1, but of a modification of the caster;

FIG. 4 is a view similar to FIG. 1, but of another modification of the caster, and FIG. 5 is a view similar to FIG. 3, but of still another modification of the caster.

Referring more particularly to FIGS. 1 and 2 of the drawings, the caster will be seen to comprise a body section 1 and a wheel section 2.

The body section 1 is in the form of a hollow spherical segment having a centrally-disposed boss 3 extending horizontally therefrom and having a recess 4 therein, and an extension 5 which provides the outer race 6 of a ball bearing, the inner race 7 of which is fixed to the vertically-extending stem 8 of the caster. The body section 1 is also provided with an annular lip or flange 1a, which serves a purpose to be presently described.

The wheel section 2 is also in the form of a hollow spherical segment which is complementary to the body section 1 and forms with the latter a substantially spherical shell. The section 2 is provided with a centrally-disposed hub 9 which extends horizontally therefrom, in axial alignment with the boss 3 and has a recess 10 therein, the wall of which has an annular groove 11 therein.

The wheel section 2 is also provided with an annular segmental portion 12 of enlarged outer diameter, which is adapted to engage the floor, in the operation of the caster. The portion 12 has its diametral plane A—A substantially perpendicular to the axis B—B of the boss 3 and hub 9. The stem 3 has its axis C—C in the diametral plane A—A, but this axis is offset horizontally from the axis B—B.

For the purpose of securing the wheel section 2 to the body section 1, the recess 4 of the boss 3 has rigidly secured therein one end 13 of an axle or shaft 14, which is provided intermediate its ends with an annular recess 15 in which a split ring 16 is disposed. This split ring 16 provides a lock spring, which when the parts 1 and 2 are to be assembled, is contracted slightly by the wall of the recess 10 of the hub 9 and then expands to enter the groove 11 in the hub 9, when the parts are in the relative position shown in FIG. 1, thereby locking the parts 1 and 2 to each other.

The flange 1a of the body section 1 not only facilitates centering of the wheel section 2 with respect to the body section during assembly of these parts, but also provides a support for the wheel section under heavy load conditions.

It is thus seen that we have provided a caster in which the stem is offset horizontally from the horizontal axis of the caster proper, and in which the floor engaging segment 12 of the wheel section lies in a vertical plane. This arrangement of features has been found to be particularly advantageous in a caster of this type or character.

In FIG. 3, a modification of the invention is illustrated, in which the caster body section 21 is similar to the body section 1 in FIGS. 1 and 2, and has rigidly mounted therein one end 22 of an axle or shaft 23.

The axle or shaft 23 has revolubly mounted thereon a caster wheel 24 of more or less conventional design, and the diametral plane of which is substantially perpendicular to the axis of the shaft 23. The vertical axis of the stem 25 of this caster is, however, offset horizontally from the axis of the shaft 23, as in FIGS. 1 and 2.

The caster wheel 24 is secured against displacement from the shaft 23 by means of a disc 26, which may be formed as a sheet metal stamping, and which is mounted on a reduced threaded extension 27 of the shaft 23. The disc 26 is secured in position by a nut 28 which is secured to the extension 27, with a lock washer 29 interposed between the disc 26 and the nut 28.

A cap 30, in the form of a hollow spherical segment, is snapped to the periphery of the disc 26.

In FIG. 4, another modification of the invention is illustrated, which is similar in all respects to that shown in FIGS. 1 and 2, but, in this case, the cross-sectional shape or configuration of the wheel section 31 is somewhat different, and the flange 32 of the body section 33 is, in effect, a continuation of the spherical cross-section of such body section.

In FIG. 5, a further modification of the invention is illustrated, in which the body section 41 is somewhat similar to the body section 21 in FIG. 3. In this case, however, the wheel 42 is provided at its side remote from the body section 41 with an annular flange 43 formed integrally with the wheel, and to which a cap 44, in the form of a hollow spherical segment, similar to the cap 30 of FIG. 3, may be snapped to secure it to the wheel 42.

It is to be understood that the forms of our invention, herewith shown and described, are to be taken as preferred examples of the same, and that various changes may be made in the shape, size and arrangement of parts thereof, without departing from the spirit of the invention or the scope of the subjoined claims.

Having thus described our invention, we claim:

1. A caster comprising, in combination, a vertical stem, a caster body revoluble about said stem and comprising a segment having an outer spherical surface, and having an extension formed integrally therewith and extending upwardly and rearwardly and terminating in a horizontal annulus which encircles the lower portion of said stem, said extension being offset laterally from the axis of said stem, said segment being hollow and having a boss extending centrally therefrom and horizontally into the space within the segment, a shaft rigidly secured in said boss and extending horizontally beyond said segment, a floor engaging wheel mounted directly on said shaft and rotatable about said shaft, said wheel having its diametral plane disposed substantially perpendicular to the axis of said shaft, with the axis of said stem disposed entirely in said diametral plane, said shaft axis being offset horizontally from the axis of said stem, whereby said wheel can revolve without obstruction from said stem, means for securing the wheel against axial displacement from said shaft, said means including a disc mounted on said shaft, and a cap, in the form of a hollow spherical segment which is snapped to the periphery of said disc, the outer surfaces of said segments and the peripheral surface of said wheel forming a substantially complete sphere.

2. A caster, as defined in claim 1, in which said shaft has a threaded end extending into said last-named segment, and a nut is secured to said threaded end for retaining said disc in position.

References Cited in the file of this patent

UNITED STATES PATENTS

| | | |
|---|---|---|
| 1,612,171 | Bingham | Dec. 28, 1926 |
| 2,539,108 | Shepherd | Jan. 23, 1951 |
| 2,606,791 | Specht | Aug. 12, 1952 |
| 2,951,258 | Brooks et al. | Sept. 6, 1960 |

FOREIGN PATENTS

| | | |
|---|---|---|
| 278,881 | Switzerland | Feb. 16, 1952 |
| 449,334 | Great Britain | June 25, 1936 |